(No Model.) 5 Sheets—Sheet 1.
A. O. HURLEY.
GLASS HEATING OVEN.
No. 526,528. Patented Sept. 25, 1894.
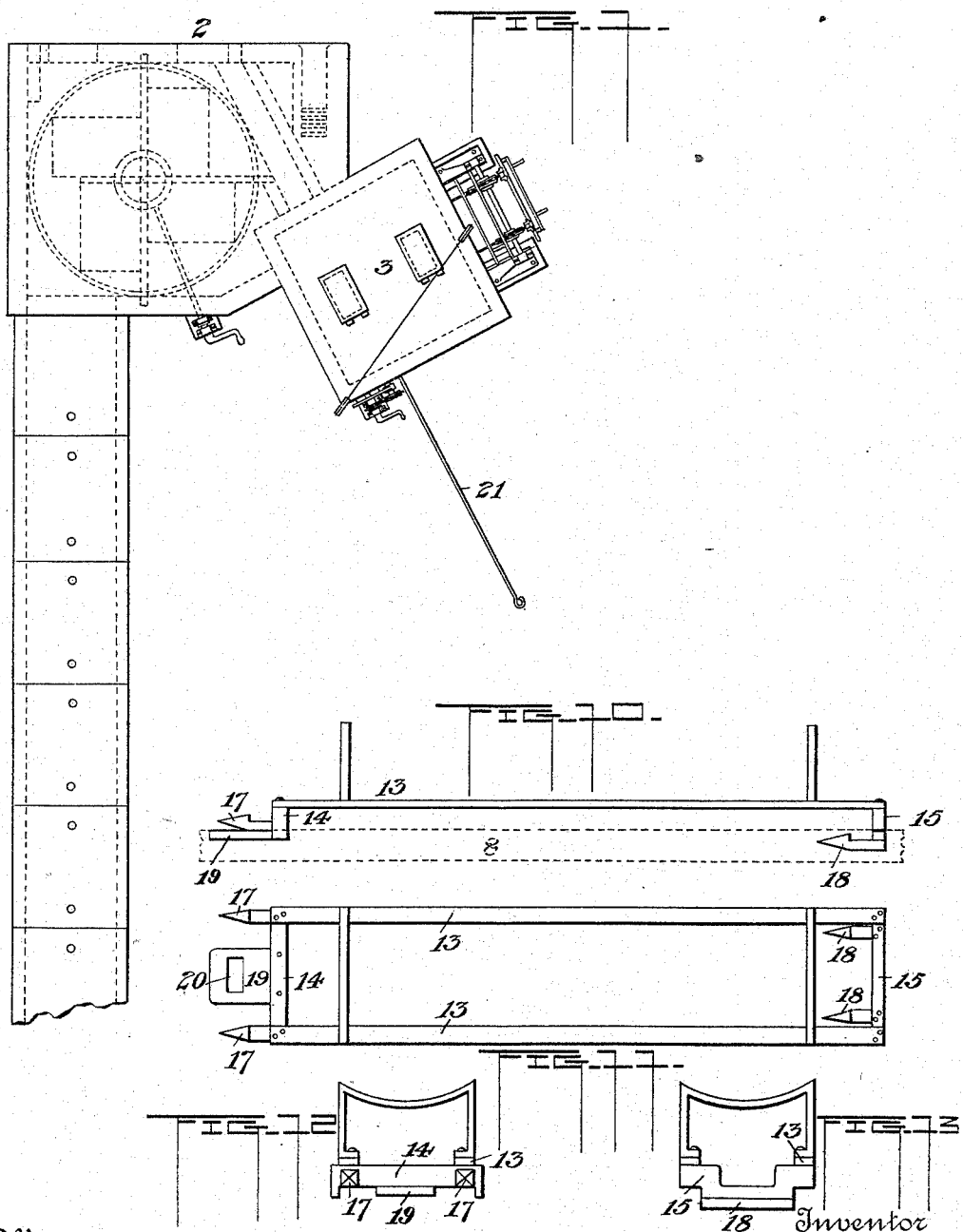
Witnesses
Inventor
Andrew O. Hurley,
by W. Bakewell & Son
his Attorneys

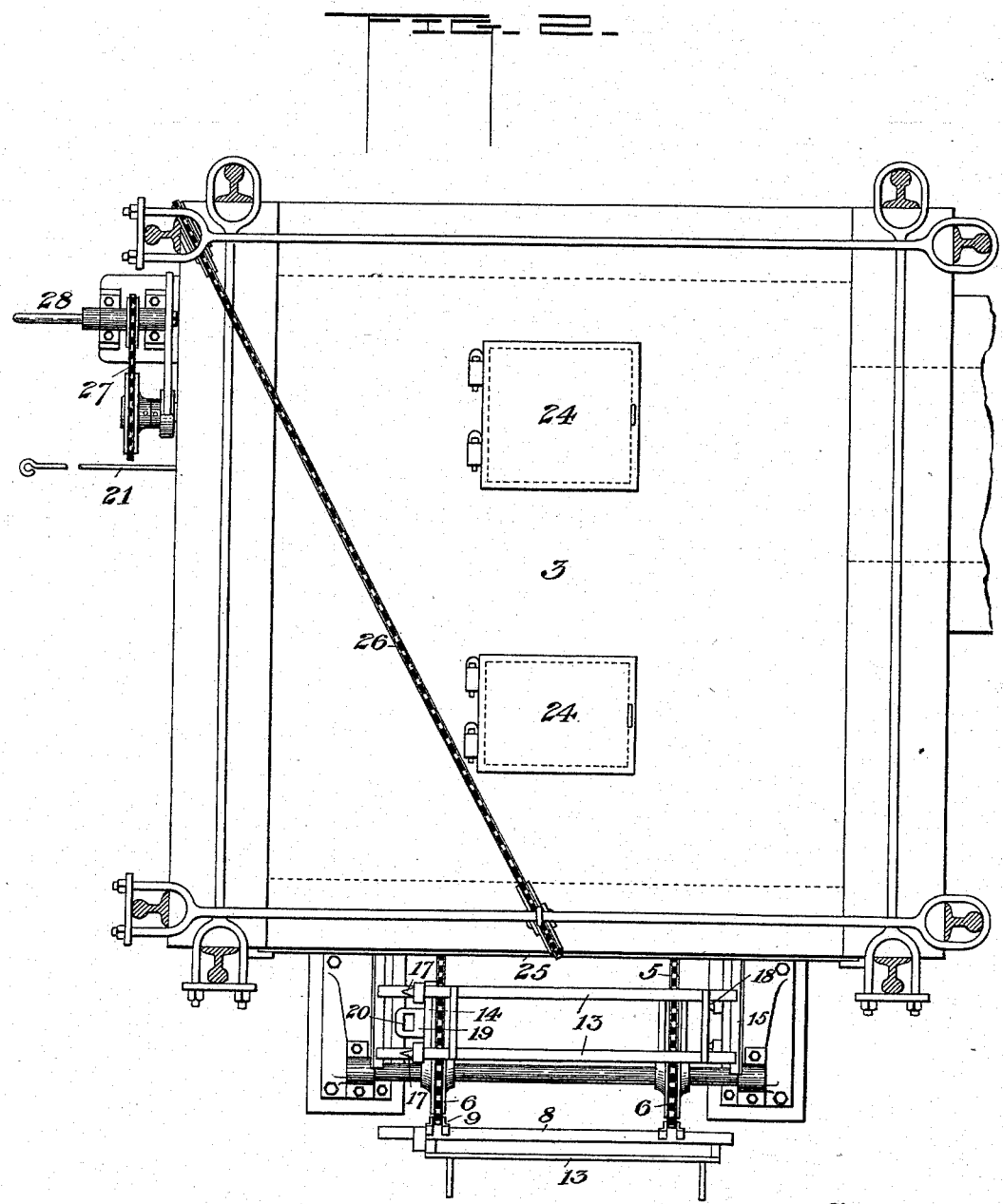

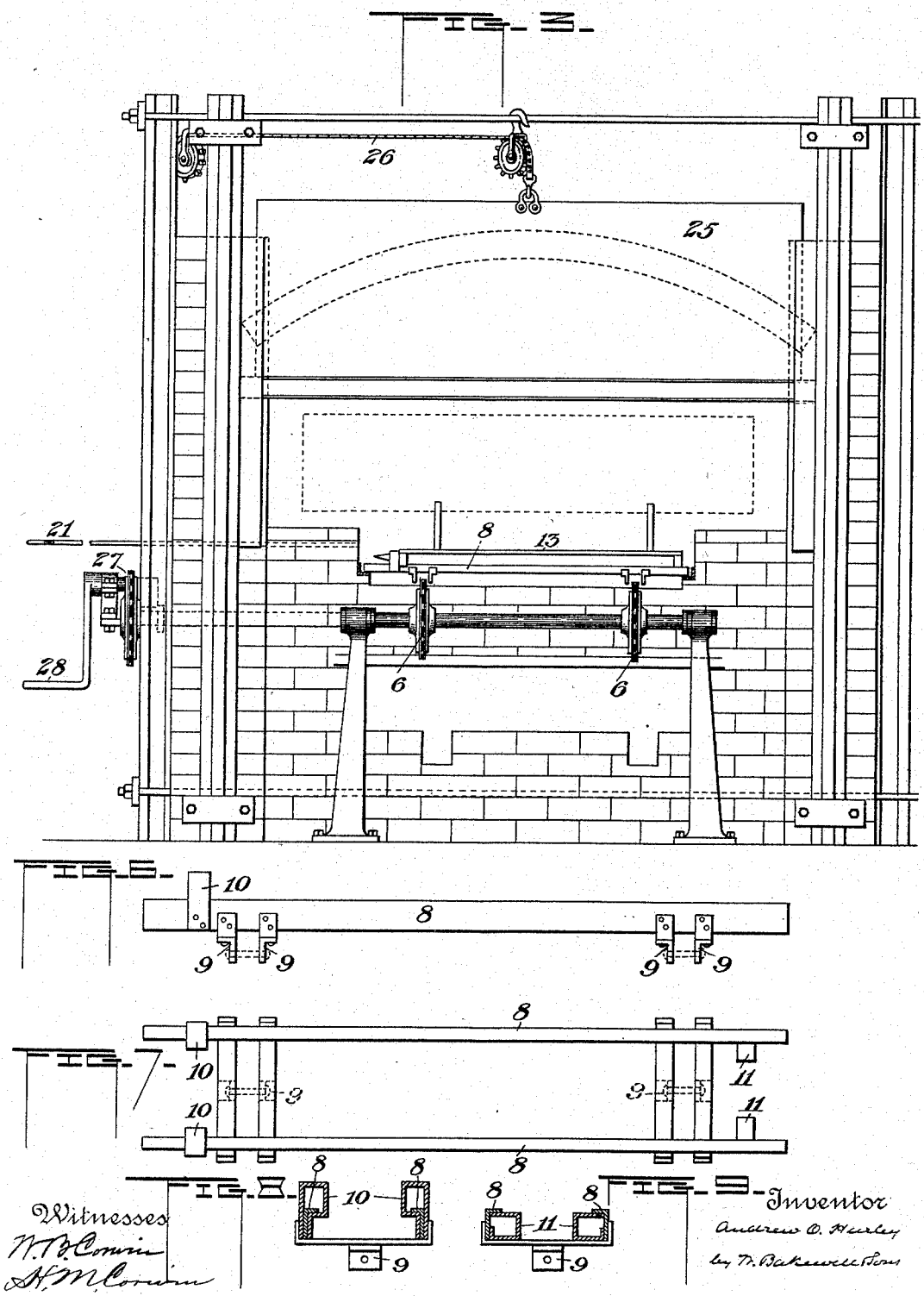

(No Model.) 5 Sheets—Sheet 4.
A. O. HURLEY.
GLASS HEATING OVEN.
No. 526,528. Patented Sept. 25, 1894.
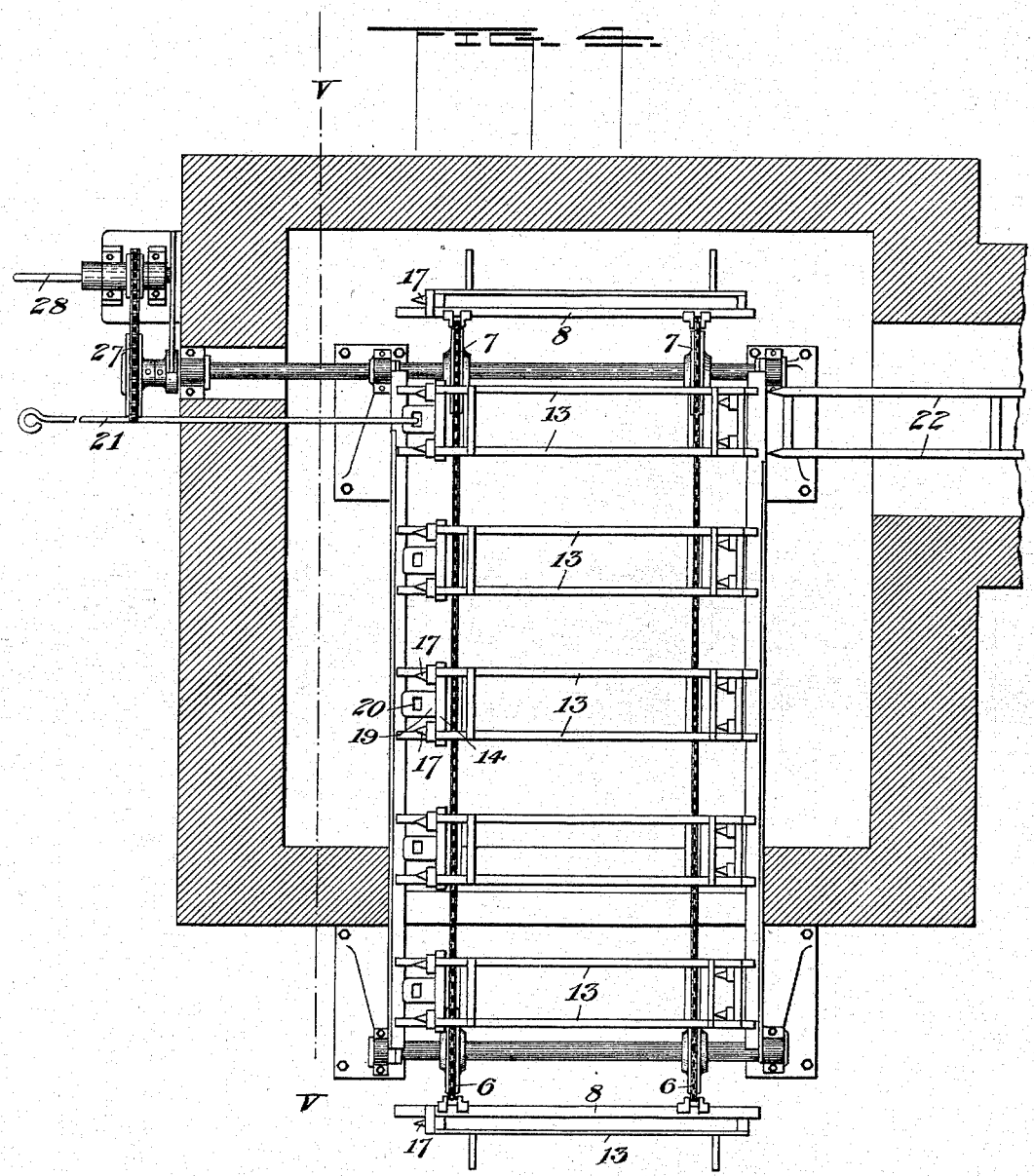
Witnesses
Inventor
Andrew O. Hurley
by W. Bakewell & Sons
his Attorneys (No Model.) 5 Sheets—Sheet 5.
A. O. HURLEY.
GLASS HEATING OVEN.
No. 526,528. Patented Sept. 25, 1894.
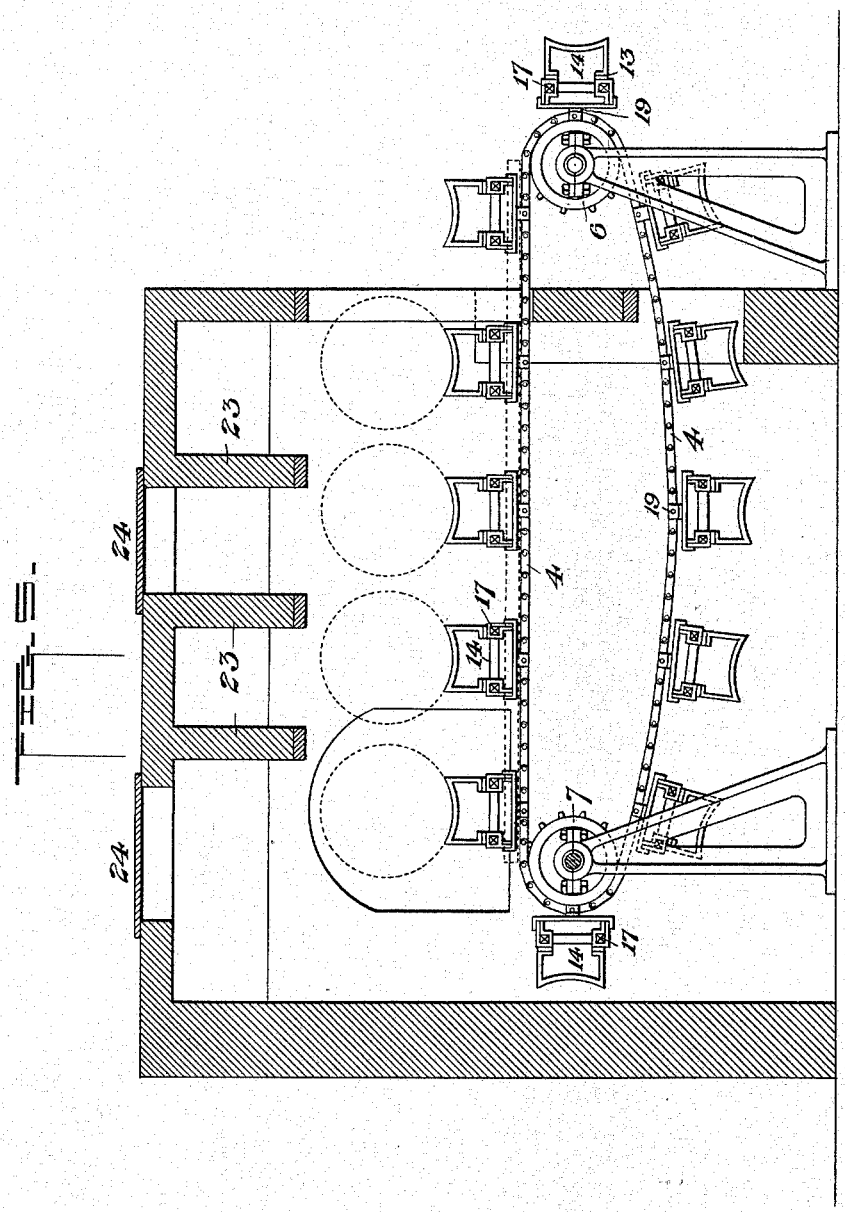
Witnesses
W. B. Corwin
H. M. Corwin
Inventor
Andrew O. Hurley
by W. Bakewell Sons
his Attorneys

UNITED STATES PATENT OFFICE.

ANDREW O. HURLEY, OF JEANNETTE, PENNSYLVANIA.

GLASS-HEATING OVEN.

SPECIFICATION forming part of Letters Patent No. 526,528, dated September 25, 1894.

Application filed November 3, 1893. Serial No. 489,938. (No model.)

*To all whom it may concern:*

Be it known that I, ANDREW O. HURLEY, of Jeannette, in the county of Westmoreland and State of Pennsylvania, have invented a new and useful Improvement in Glass-Heating Ovens, of which the following is a full, clear, and exact description, reference being had to the accompanying drawings, forming part of this specification, in which—

Figure 1 is a general plan view of a flattening oven provided with my improved heating oven. Fig. 2 is an enlarged plan view of the heating oven alone. Fig. 3 is a front elevation of the same. Fig. 4 is a horizontal sectional view of the oven above the carriers. Fig. 5 is a vertical longitudinal sectional view on the line V—V of Fig. 4. Figs. 6 and 7 are side and top plan views respectively of one of the carriages; and Figs. 8 and 9 are cross-sectional views of the guides upon the carriage. Figs. 10 and 11 are side and top plan views of one of the saddles; and Figs. 12 and 13 are opposite end views of the same.

Like symbols of reference indicate like parts in each.

My invention relates to the improved glass-heating oven disclosed in my prior patent, No. 478,328, granted July 5, 1892, and is designed to provide improved means for carrying the glass cylinders through the heating oven to the flattening wheel.

To that end it consists in an endless carrier having removable saddles arranged to support the glass cylinders and means for moving the saddles laterally from the chain into the flattening oven.

It also consists in the construction and arrangement of parts as hereinafter more fully described and set forth in the claims.

In the drawings, 2 represents the flattening oven and 3 the preliminary heating oven arranged to gradually heat the cylinders on their way to the flattening stones. To move the cylinders step by step through this heating oven, I provide an endless carrier consisting of two parallel sprocket chains 4 and 5, carried upon pairs of sprocket-wheels 6 and 7, the wheels 6 being exterior to the oven. Secured to these chains are the rests or supports which extend across and are fastened to the same by bolts passing through downwardly projecting lugs 9. The rests consist of parallel tracks or guideways 8, as shown in Figs. 6 and 7, and near one end of the tracks are secured holders 10, consisting of metal loops located above the tracks, while between the opposite end portions are secured the similar lower loops 11. Upon these tracks slide the removable saddles of Figs. 10 and 11, each consisting of side-bars 13 and end-bars 14 and 15. These end bars are provided with suitable recesses to guide them upon the tracks, and to them are secured the projecting pointed lugs or guides 17 and 18, the pair 17 being at a higher level and spaced farther apart than the pair 18. To the front bar 14 is secured the forwardly projecting plate 19, having a hole 20 for the insertion of the hooked inner end of a rod 21 movable through a hole in the wall of the heating furnace in line with the flattening oven and arranged to push the saddle from the rest upon a track 22, which is in alignment with the track 8 upon the rest in its innermost upright position. The track 22 extends to the flattening wheel, as shown in dotted lines in Fig. 1.

The heating-oven is provided with suitable mantels 23, roof doors 24, and a vertically adjustable front door 25, operated by a suitable chain 26. The endless carrier is actuated by external sprocket gearing 27 connecting with the shaft carrying the inner sprocket-wheels 7, this gearing being actuated by crank 28.

The operation is as follows: The carrier being moved intermittently by the handle 28 a distance equal to the space between the rests, and the glass cylinders placed upon each saddle in its outer upright position, at each stop the track of one of the rests is in line with the track 22. The rod 21 then being engaged with the plate 19, the saddle is pushed from the rest into the flattening oven upon the track 22, the lugs 17 and 18 leaving the holders 10 and 11. The flattener removes the cylinder from the saddle, which is then pulled back into place upon the rest and held thereon by the lugs entering the holders. The carrier then being advanced another step, the action is continued.

The advantages of my device result from its simplicity and cheapness, the perfect control had over the movements, and the few handlings of the cylinders required.

Many variations in the form, construction and relative arrangement of the parts of the apparatus may be made by those skilled in the art within the scope of my invention, as claimed, since

What I claim is—

1. The combination with a flattening-oven having a cooling leer leading therefrom, and a heating-oven leading thereto, of an endless carrier movable through the heating oven, removable saddles thereon, and means for moving said saddles from the carrier into the flattening-oven; substantially as described.

2. The combination with a flattening oven having a cooling leer leading therefrom and a heating oven leading thereto, of an endless carrier movable through the heating-oven, rests secured to the chain, removable saddles held upon the rests, and means for moving said saddles into the flattening-oven; substantially as described.

3. The combination with a flattening-oven having a cooling leer leading therefrom and a heating-oven leading thereto, of an endless carrier movable through the heating-oven, rests secured to the carrier and having tracks thereon, saddles removably held upon said tracks, and means for moving the saddles laterally from the rests upon a track leading to the flattening-oven; substantially as described.

4. The combination with a flattening-oven having a cooling leer leading therefrom and a heating-oven leading thereto, of an endless carrier movable through the heating-oven, rests secured to the chain and having holders thereon, saddles movable along tracks upon said rests and having lugs engaging the holders, and a rod arranged to push the saddles from the rests upon a track leading to the flattening-oven; substantially as described.

In testimony whereof I have hereunto set my hand.

ANDREW O. HURLEY.

Witnesses:
W. B. CORWIN,
H. M. CORWIN.